Feb. 14, 1967  F. R. ADAMS  3,304,526
PROPORTIONAL MAGNETIC ACTUATOR DEVICE
Filed May 3, 1965
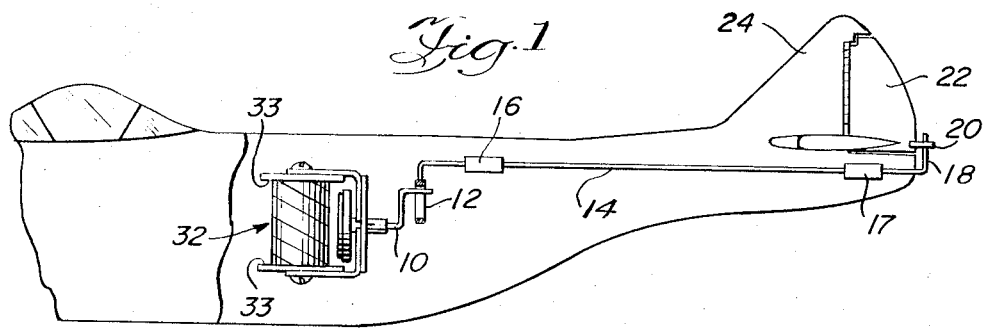
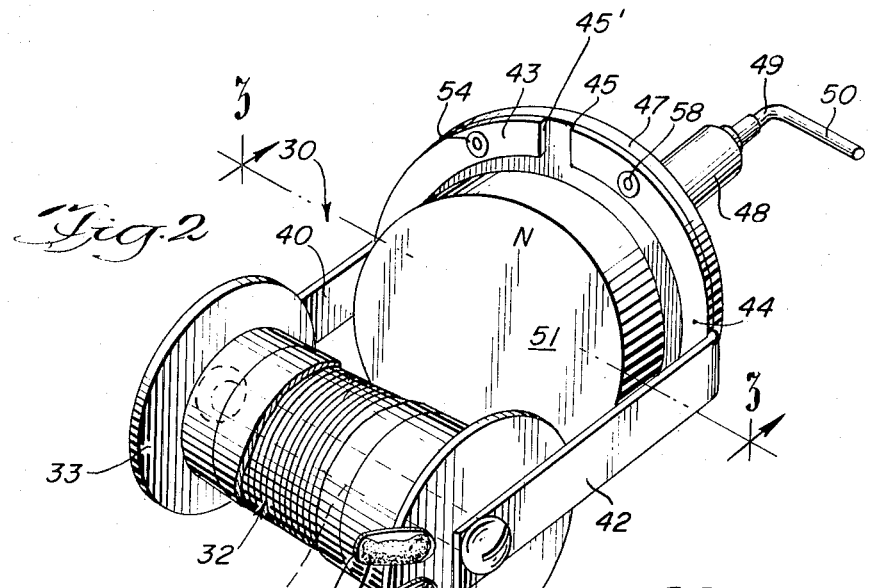
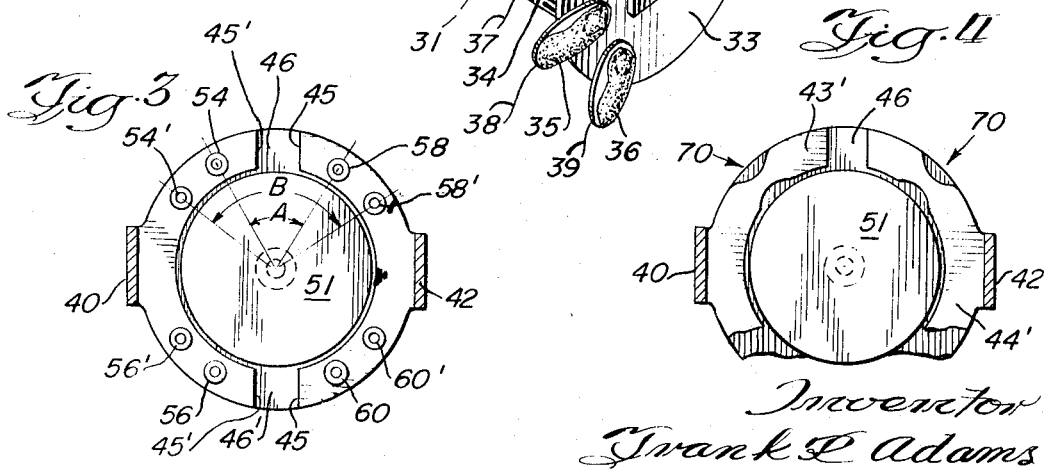
Inventor
Frank R. Adams
By Silverman & Cass
Attorneys

United States Patent Office 3,304,526
Patented Feb. 14, 1967

3,304,526
PROPORTIONAL MAGNETIC ACTUATOR DEVICE
Frank R. Adams, 2625 Ruger Ave.,
Janesville, Wis. 53545
Filed May 3, 1965, Ser. No. 452,738
7 Claims. (Cl. 335—230)

This invention relates generally to magnetic-type actuators which will slave to pulsed radio signals and more particularly, relates to a magnetic actuator or self-neutralizing servo of the character described having novel magnetic pole pieces provided with indexing means for governing the indexed position of the rotor unit or permanent magnet armature when the coil windings are selectively energized to full control conditions.

The magnetic-type actuator with which this invention is concerned is of the same general type described and illustrated in my Patent No. 2,771,572 for the invention entitled "Polarized Self-Neutralizing Servomotor." Such an actuator device is especially advantageous for achieving, through repeated brief electronic control signals, pulsed in rate or in duration, or variations of both rate and duration, a proportional system for operating a control means such as the steering mechanism of a radio-controlled model vehicle to which the armature of the actuator is connected.

A so-called proportional control system of the type capable of being realized by means of the magnetic actuator embodying the invention may be defined as one which can vary the nature of a control surface or member, such as the rudder of a model airplane or marine vessel smoothly to a selected position between neutral and full control, either right or left or up and down, depending upon the type of control surface or member being actuated. Thus, the magnetic actuator can be connected to slave to pulsed electronic signals which are picked up by a receiver on the model vehicle, the actuator being linked to the control surface thereby to provide a degree of steering that corresponds to the position or amount of movement of a control stick or control knob on or connected to the transmitter. It is common in radio controlled model practice to use a steady radio frequency or "carrier" frequency which may have an audio frequency superimposed thereon, the continuous or steady carrier or RF frequency being keyed on-off or pulsed. The proportional system is achieved by providing for electrical centering of the control surface when the transmitter is sending out even signals or pulses. At the no signal condition of the transmitter, the control surface such as a rudder, can be indexed to a full left rudder, for instance. Then, a solid signal would index the rudder to a full right position. Pulses of equal duration would produce a neutral or center position for the rudder whereas, variations in the signal pulsing would give corresponding partial rudder movement to either side desired. The repeated movements of the actuator or servo responsive to the pulsed radio signals cause the control surface or member to oscillate back and forth but only the averaged position of such oscillations causes a corresponding response in the radio controller vehicle. Thus, the proportional magnetic actuator or self-neutralizing servo of the type with which the invention is concerned is capable of supplying directly the control movement demanded by the position of the pulser control member of the transmitter.

The actuator of said Patent No. 2,771,572 provided a very light weight and small volume electromagnetic device capable of achieving a proportional actuator in the radio controlled model vehicle field, either for single-channel or multichannel applications. The actuator embodying the herein invention is capable of operation on the same theories as that of said Patent No. 2,771,572. It is distinctive therefrom in the novel means provided for indexing the position of the armature and hence, the control surface or member linked thereto in either of the full control positions to which it will move in respect of the no signal and solid signal condition of the radio transmitter. The novel indexing means is realized with an actual reduction in the weight and size of the magnetic actuator and without recourse to mechanical stop members.

Accordingly, the primary object of the invention is to provide a magnetic actuator of the character described having novel indexing means capable of materially and significantly increasing the advantages and effectiveness of this type of device for proportional control or action in the radio controlled model vehicle field.

An important object of the invention is to provide a magnetic actuator or self-neutralizing servo device of the character described in which the polar arms or pole pieces of an electromagnet have portions of reduced cross-sectional area at selected locations thereon with which the poles of the permanent magnet armature automatically register or index when either of the actuator coils or windings are energized or polarized.

Another object of the invention is to provide a self-neutralizing servo device of the character described in which the polar arms or pole pieces have selectively located reduced dimension cross-sectional area portions providing a zone of flux-restriction at which leakage of flux will occur when the pole piece is magnetically saturated due to the energization of the actuator windings.

A further object of the invention is to provide an actuator or servo device of the character described which has novel pole pieces of substantially diminished mass and volume of space occupied thereby provided with the said indexing means, said indexing means capable of being derived in any of a plurality of different ways indicative of the versatile character of the invention with its attendant advantage in the model vehicle field.

Yet another object of the invention is to provide a compact actuator that produces an output torque of sufficient magnitude to effectively control a model vehicle.

Other important advantages of the invention as derived from specific application thereof to the radio controlled model vehicle field reside in the economical structure permitting said advantages to be attained, the accuracy and versatility of the indexing capable of being realized therewith, the increased torque generated by said actuator, and the provision of specific eyelet means in one embodiment of the invention for achieving the desirable and effective indexing of the permanent magnet armature.

The foregoing and other objects of the invention will become apparent from the ensuing description in which a preferred embodiment and one modification of the invention have been described in detail and illustrated in the accompanying drawing. It is contemplated that minor variations in the physical structure of the indexing means of the magnetic actuator embodying the invention may occur to the skilled artisan without departing from the scope or sacrificing any of the advantages thereof.

In the drawing:

FIG. 1 is a diagrammatical view showing the magnetic actuator embodying the invention in a representative operational system.

FIG. 2 is a perspective view of the magnetic actuator embodying the invention having one form of said indexing means provided on pole pieces thereof.

FIG. 3 is a sectional view taken through said actuator along the line 3—3 of FIG. 2 and in the direction indicated generally.

FIG. 4 is a fragmentary perspective view showing a pole piece of modified form providing the flux restriction zones for achieving the leakage of flux desired for indexing the rock shaft of the actuator.

Referring now to the drawing, in FIG. 1 is shown diagrammatically an installation of the magnetic-type actuator embodying the invention for proportional control of the rudder of a model-type airplane. The installation is only representative of a proportional system for operating a control system since the control surface or member which is to be moved selectively by the actuator can be the rudder of a marine vessel or linkage to the front wheels of an automobile or other suitable steering mechanism. As seen in FIG. 1, the actuator has an arm 10 which can be oscillated back and forth selectively by rapid reversing of the polarity in the actuator winding or windings so that the actuator slaves or responds to the movement of a control stick or knob on or connected to the transmitter pulser in a well known manner. The arm 10 is connected through the link 12 to a torque rod or bar 14 supported between opposite ends in the bearings 16 and 17 respectively. The torque rod has a pin 18 at its remote end which is engaged with a loop 20 on the rudder 22 hingedly connected on the fin 24 of the model vehicle. Thus, the rudder 22 will respond to selective energizing and de-energizing of the actuator winding. Manifestly, some means will be provided to fix the maximum limits of angular travel of the arm 10 which would be less than 180 degrees.

In the interest of brevity and clarity, a transmitter with pulser arrangement and receiver with a direct current source and proper switching means to effect selective energization and reversing of polarity in the coil or coils of such a magnetic actuator have been omitted. Such conventional structures can vary within wide limits and have no bearing on the herein invention.

Referring to FIG. 2, the magnetic actuator embodying the invention has been designated generally by the reference character 30. The actuator 30 includes an electromagnet, the core 31 of which is provided by a bolt, shown in dotted lines. The core mounts an actuator winding 32 which can be either a single coil of wire with a common center tap and proper terminal leads or a pair of coils with a common center tap. The core 31 is supported between a pair of plastic end flanges or discs 33, one of said flanges 33 mounting three terminals or contacts 34, 35 and 36, to which electrical leads 37, 38 and 39, respectively, are connected. As understood in the art, the coil 32 is connected to be selectively energized from a battery or direct current supply by means of the receiver which controls operation of a suitable switching arrangement. Where the contacts of the switch connect the battery supply across leads 37, 38, the core is magnetized to achieve one condition of polarity for the pole pieces. To reverse the condition of polarity of the pole pieces, the battery supply is connected across leads 38, 39. Thus, the lead 38 is a center tap and leads 37 and 39 are terminal leads for selectively energizing the coil 32 from a battery supply, not shown, in response to signals received from a transmitter pulser by a receiver in the model vehicle.

Extending transversely from each end of the core 31 are the parallel polar arms 40 and 42 which are provided at their extremities remote from the core with pole pieces 43 and 44 respectively. Each arm is connected to a pole piece medially between the extremities of the pole piece. Each of said pole pieces is a flat, strip of metal of uniform width and thickness, substantially semi-circular in outline and at a right angle to the polar arm to which it is connected. Thus, the pole pieces 43 and 44 are aligned facing each other in a common plane spaced from the axis of the core and with their respective extremities 45, 45', spaced apart to provide the air gaps 46 and 46', respectively. The provision of the air gaps improves the operational characteristics of the actuator, although a unitary magnetizable circle formed by the pole pieces could be used, if desired.

The pole pieces 43 and 44 are joined to a non-magnetic disc 47 in a special manner which also contributes to the advantages of the invention. The disc 47 has an integral tubular bearing 48 for an armature or rock shaft 49. The shaft 49 has a right angle extension 50 which corresponds to the arm portion 10 of FIG. 1 which is engaged in the link 12 and imparts the desired torque to control the rudder 22.

The shaft 49 supports a permanent magnet 51 which is rotatable, the shaft extending axially through the center of the disc 47 and into the upper surface of the magnet. The right angle portion 50 provides the indexing arm by means of which the actuator controls the steering mechanism of the desired model vehicle.

The pole pieces are secured to the disc 47 by means of hollow non-ferrous rivets 54, 56, 58 and 60 as seen in FIG. 3. Rivets 54 and 60 are spaced 180° apart on the pair of pole pieces and cooperate with one another, and rivets 58 and 56 function in the same manner. Rivets 54 and 56 hold the disc 47 to the pole piece 43 and the rivets 58, 60 hold the pole piece 44 to the disc 47 and also serve as indexing points in the manner described hereinafter.

The rivets or eyelets 54, 56, 58 and 60 are hollow and are formed of a non-ferrous or non-magnetizable material. Each of said rivets extends through the pole piece with which it is associated so that in effect each of said pole pieces has a portion removed therefrom where the rivet passes through the pole piece. This results in a reduction in the cross-sectional area of the material of the pole piece at the location thereon through which the hollow rivet or eyelet passes. The location or zone of the reduced cross-sectional area of the pole piece or the hole through which the eyelet passes to provide an air gap establishes an index position for the magnet 51 in a full control position for the armature. It may be noted that the magnet 51 is located between the disc 47 and the coil 32.

The electromagnet of the actuator controls operation of the permanent magnet armature by reversing the polarity of the electromagnetic stator poles or ends of the pole pieces. As the stator poles alternately reverse from north to south, they develop an alternating magnetic field to react with the north and south poles of the permanent magnet 51 causing the rotor unit or permanent magnet armature to rock alternately clock-wise and counter clock-wise through an arc of predetermined, limited length. This is accomplished by means of the transmitter pulser which causes reversal in polarity of the pole pieces 43 and 44 according to the direction of current flow from the battery to the coil 32. FIG. 2 shows the actuator in the position assumed by the north pole of magnet 51 when pole piece 43 is a south pole and pole piece 44 is a north pole. The edge 45' of pole piece 43 is the zone of maximum leakage flux and the north pole of magnet 51 is momentarily attracted thereto. By reversing the flow of the current to the coil 32, the polarity of the pole pieces 43 and 44 can be reversed and the edge 45 of the pole piece 44 will momentarily attract the north pole of magnet 51. Consequently, the magnet 51 will move from the position thereof shown in FIG. 2 until the north pole of magnet 51 will tend to line up with newly created south pole piece 44 at index point 58. Simultaneously, the south pole of magnet 51 will tend to line up with rivet 56 in pole piece 43. Manifestly, the position of the hollow rivets establish the full control position of the indexing arm 49 in preference to the momentary attraction of the edges of the pole pieces.

When the coil 32 is energized for a full control position, the flux from the core 31 will saturate the pole pieces 43 and 44. When a pole piece is saturated, the point at which the rivet passes therethrough is a point of flux restriction or decreased area, and it is at this zone of maximum magnetic impedance that the flux through the pole piece will leak off to establish a path of lesser resistance. Such leakage points correspond to the location of the rivets 54, 56, 58 and 60, respectively. Thus, when the pole piece 44 is the south pole, the north pole of the magnet 51 will oscillate past the position shown in FIG. 2 to index at the rivet 58, in the full control position established by the full arm condition of the transmitter. Correspondingly, upon reversal of polarity so that pole piece 43 becomes the south pole, the north pole of the permanent magnet 51 will index at the rivet 54. Thus, the arc of oscillation or the limits of movement permitted for the magnet 51 is indicated by reference character A in FIG. 3 and is a function of the preselected positions of the leakage points provided by the rivets 54 and 58, respectively.

With the coil 32 de-energized, pole pieces 43 and 44 likewise will be de-energized. However, the edges of the pole pieces will tend to function as an armature to complete a magnetic flux circuit between the north and south poles of the magnet 51. Magnet 51 will adjust itself to a position in which the maximum amount of flux will pass through the pole pieces 43 and 44. It should be noted that the magnetic flux will always follow the path of least resistance, and that the neutral or rest position of the actuator need not necessarily be in alignment with either of the air gaps, but merely some self-neutralizing position.

FIG. 3 also illustrates the manner in which the indexing points may be altered to a different position on the pole pieces 43 and 44 closer to the polar arms 40 and 42. Since the leakage flux occurs at the point or zone of least magnetic resistance closest to the polar arms, when these new restrictions 54' and 58' are created, the magnetic path will be shortened and the original indexing points, indicated by reference character A, will be effectively short-circuited out of the magnetic circuit. The new restriction zones will thereby represent the altered indexing points, and the rock shaft will be constrained to oscillate between these limits, identified by reference character B, in the manner described in detail above. This structure, which permits modification of indexing points, makes the magnetic actuator readily adaptable for use with a plurality of different control surfaces requiring variations in their preselected arc of oscillation. Although flux restriction points 54', 56', 58' and 60' have been shown provided by hollow rivets, these also can be provided merely by holes in the pole pieces facing toward the magnet 51.

An alternative manner of creating leakage restrictions or indexing points without using rivets is shown in FIG. 4. The pole pieces 43' and 44' each has a necked portion 70 at a selected location which functions to reduce the cross-sectional area of the pole piece at a precise location thereon and provide a flux leakage point. This corresponds to the location of a flux leakage point achieved by a rivet. Other ways of providing a flux restriction portion on a pole piece for indexing purposes are contemplated within the purview of the invention.

It is believed that the invention has been described in sufficient detail to enable the skilled artisan to understand and practice the same. The invention has been pointed out in the claims appended hereto in language intended to be broadly construed commensurate with the advance in the arts and sciences engendered by this device.

What it is desired to secure by Letters Patent is:

1. A light weight actuator adapted for use in controlling model vehicles comprising:
   (a) an electromagnet having a core,
   (b) a winding on said core,
   (c) magnetizable means connected to the ends of said core, and selectively energized thereby,
   (d) said magnetizable means disposed in a common plane to complete a magnetic circuit,
   (e) a magnetized member mounted in a plane parallel to said common plane,
   (f) a rock shaft joined to the surface of said magnetized member for movement therewith,
   (g) said magnetizable means having zones of reduced cross-sectional area formed therein,
   (h) said zones permitting maximum leakage flux to escape therefrom and to attract said magnetized member into alignment therewith when said magnetizable means are energized, and said rock shaft being indexed in accordance with the movement of said magnetized member,
   (i) said magnetizable means comprising a pair of magnetizable polar arms extending axially from the ends of the core, said polar arms having inturned pole pieces at the ends thereof, said pole pieces each being a flat strip of material of substantially uniform width and semi-circular in shape and mounted upon the periphery of a plastic disc, said pole pieces being separated by air gaps.

2. The device of claim 1 in which said plastic disc has a central opening, a tubular sleeve encircling said opening, and said rock shaft extends outwardly from the upper surface of said magnetized member through said opening and said sleeve to be indexed in accordance with the movement of said magnetized member.

3. The device of claim 1 in which said zones of minimum cross-sectional area are formed by necking portions of said pole pieces 4. The device of claim 1 in which said zones of minimum cross-sectional area are formed by punching holes in said pole pieces.

5. A light weight and compact actuator adapted for use in controlling model vehicles comprising:
   (a) an electromagnet having a core,
   (b) a winding on said core,
   (c) magnetizable polar arms connected to the ends of said core and each having a pole piece,
   (d) a permanent magnet mounted in axial alignment with said pole pieces,
   (e) a bearing sleeve extending between said pole pieces and a rock shaft positioned within said bearing and extending axially to the surface of said magnet,
   (f) said pole pieces being formed with zones of minimum magnetizable cross-sectional area,
   (g) said zones attracting the permanent magnet into alignment therewith when said magnetizable pole pieces are polarized by the selective energization of said winding on the core of said electromagnet, and
   (h) the movement of said magnet indexing said rock shaft affixed thereto.

6. A light weight actuator adapted for use in controlling model vehicles comprising:
   (a) an electromagnet having a core,
   (b) a winding on said core,
   (c) magnetizable means connected to the ends of said core, and selectively energized thereby,
   (d) said magnetizable means disposed in a common plane to complete a magnetic circuit,
   (e) a magnetized member mounted in a plane parallel to said common plane,
   (f) a rock shaft joined to the surface of said magnetized member for movement therewith,
   (g) said magnetizable means having zones of reduced cross-sectional area formed therein,
   (h) said zones permitting maximum leakage flux to escape therefrom and to attract said magnetized member into alignment therewith when said magnetizable means are energized, and said rock shaft being indexed in accordance with the movement of said magnetized member,
   (i) said zones of minimum cross-sectional area being formed by holes punched in said pole pieces,
   (j) and non-ferrous eyelets engaged in the poles for mounting said pole pieces.

7. A light weight actuator adapted for use in controlling model vehicles comprising:
 (a) an electromagnet having a core,
 (b) a winding on said core,
 (c) magnetizable means connected to the ends of said core, and selectively energized thereby,
 (d) said magnetizable means disposed in a common plane to complete a magnetic circuit,
 (e) a magnetized member mounted in a plane parallel to said common plane,
 (f) a rock shaft joined to the surface of said magnetized member for movement therewith,
 (g) said magnetizable means having zones of reduced cross-sectional area formed therein,
 (h) said zones permitting maximum leakage flux to escape therefrom and to attract said magnetized member into alignment therewith when said magnetizable means are energized, and said rock shaft being indexed in accordance with the movement of said magnetized member,
 (i) said magnetizable means comprising a pair of magnetizable polar arms extending axially from the ends of the selectively energized core, said polar arms having inturned pole pieces at the ends thereof,
 (j) said pole pieces being semi-circular in shape and mounted about the periphery of a plastic disc, said pole pieces being separated by air gaps,
 (k) each of the pole pieces having holes punched therein to form zones of minimum cross-sectional area, each hole in one of said pole pieces having a corresponding hole in the other of said pole pieces, said holes being separated by 180° angle, thereby creating a zone of attractive force for both poles of said magnetized member.

References Cited by the Examiner

UNITED STATES PATENTS 2,771,572   11/1956   Adams _____ 317—172

BERNARD A. GILHEANY, *Primary Examiner.*

G. HARRIS, *Assistant Examiner.*